United States Patent Office 3,776,933
Patented Dec. 4, 1973

3,776,933
METHOD OF PREPARING AMIDOSILANES
Louis H. Toporcer, Ingersol Township, Midland County, and Irvin D. Crossan, Homer Township, Midland County, Mich., assignors to Dow Corning Corporation, Midland, Mich.
No Drawing. Filed Sept. 29, 1972, Ser. No. 293,606
Int. Cl. C07f 7/10
U.S. Cl. 260—448.2 E            11 Claims

ABSTRACT OF THE DISCLOSURE

Mixing metal salts of organic amides with organohalosilanes in an inert organic solvent is a useful method for preparing amidosilanes of the formula $$R''_xSi\{N(R)C(O)R'\}_{4-x}$$

where R is methyl, ethyl, propyl or phenyl, R' is methyl, ethyl or phenyl, R'' is a hydrocarbon radical and $x$ is 1, 2 or 3. The by-produced metal halide is separated from the amidosilane solution which can be used to make silicone elastomers and resins. The organic solvent can be separated from the amidosilane to provide the amidosilane for use in silicone elastomers and resins where solvents are not desired.

---

This invention relates to a process for making amidosilanes.

Amidosilanes are known in the art as shown by Hurwitz and de Benneville in U.S. Pat. No. 2,876,234 in which a broad class of amidosilanes are taught. Also in U.S. Pat. No. 2,876,209, de Benneville and Hurtwitz teach amidosilanes. One method of preparation taught by de Benneville and Hurwitz comprise slowly adding a chlorosilane to a mixture of amide, tertiary amine acid acceptor and solvent such as benzene. This method is slow, in some cases, the addition of the chlorosilane is dropwise and may require several days. Another disadvantage of this method is that the reaction produces large quantities of amine salts which must be either recovered or destroyed neither of which represents a suitable solution to the disposal problem.

Another method described by de Benneville and Hurwitz attempts to avoid some of the disadvantages of the method described above, but other disadvantages are observed. This method comprises heating a mixture of an aminosilane and amide whereby the amide replaces the amino group of the silane and the resulting amine distills from the mixture. This method, however, has the disadvantages that the chlorosilanes have to be converted first to an aminosilane and that the by-product is still an amine which must be recovered or destroyed which still does not resolve the disposal problem.

It is therefore an object of the present invention to provide a method for making amidosilanes which produces less objectionable by-products and which is readily adapted to commercial use. This object and others will become more apparent from the following detailed description.

This invention relates to a method for the preparation of amidosilanes comprising mixing a metal salt of an organic amide and an organohalosilane under anhydrous conditions in a sufficient amount of an inert organic solvent to allow separation of product from by-produced metal halide, while maintaining the reaction mixture under agitation at least until the reaction is complete, said metal salt of an organic amide having a formula $$MN(R)C(O)R'$$

in which M is selected from the group consisting of lithium, sodium and potassium, R is selected from the group consisting of methyl, ethyl, propyl and phenyl, and R' is selected from the group consisting of methyl, ethyl and phenyl, said organohalosilane having a formula $R''_xSiX_{4-x}$ in which each R'' is a monovalent hydrocarbon radical having from 1 to 18 carbon atoms per radical, X is selected from the group consisting of chlorine, bromine and iodine, and $x$ is an integer from 1 to 3 inclusive, and thereafter separating by-produced metal halide from an organic solvent solution of amidosilane of the formula $R''_xSi\{N(R)C(O)R'\}_{4-x}$ wherein R, R', R'' and $x$ are defined above.

The amidosilanes can readily be prepared by mixing the metal salt of an oragnic amide with an organohalosilane under anhydrous conditions in an inert organic solvent. The metal salt of the organic amide has a formula $MN(R)C(O)R'$ in which M is lithium, sodium or potassium, R is methyl, ethyl, propyl, or phenyl and R' is methyl, ethyl or phenyl. Examples of the metal salt of the organic amide include sodium N-methylacetamide, sodium N-ethylacetamide, sodium N-propylacetamide, sodium N-phenylacetamide, sodium N-methylpropionamide, sodium N-methylbenzamide, sodium N-ethylpropionamide, sodium N-propylpropionamide, sodium N-phenylpropionamide, sodium N-ethylbenzamide, sodium N-propylbenzamide, sodium N-phenylbenzamide, potassium N-methylacetamide, potassium N-ethylacetamide, potassium N-propylacetamide, potassium N-phenylacetamide, potassium N-methylpropionamide, potassium N-methylbenzamide, potassium N-ethylpropionamide, potassium N-propylpropionamide, potassium N-phenylpropionamide, potassium N-ethylbenzamide, potassium N-propylbenzamide, potassium N-phenylbezamide, lithium N-methylacetamide, lithium N-ethylacetamide, lithium N-propylacetamide, lithium N-phenylacetamide, lithium N-methylpropionamide, lithium N-methylbenzamide, lithium N-ethylpropionamide, lithium N-propylpropionamide, lithium N-phenylpropionamide, lithium N-ethylbenzamide, lithium N-propylbenzamide, and lithium N-phenylbenzamide.

The metal salts of the organic amides are prepared by refluxing a mixture of the respective metal with an organic amide in an inert organic solvent such as toluene, benzene, other hydrocarbon solvents and ethers. The metals are preferably in a finally divided state in the reaction mixture. Preferably the reaction ingredients are dry and the reaction is carried out under an inert atmosphere such as nitrogen. Examples of the organic amides include N-methylacetamide, N-ethylacetamide, N-phenylacetamide, N-methylpropionamide, N-methylbenzamide, N-ethylpropionamide, N - propylpropionamide, N - propylacetamide, N-phenylproionamide, N-ethylbenzamide, N-propylbenzamide and N-phenylbenzamide. The solvent can be removed and the metal salt of the organic amide recovered for use or the metal salt of the organic amide solution can be used as such for making the organoamidosilanes. Because the metals are used in this process, the products should have any excess metal, such as sodium, removed before further use to avoid the danger of fire should water accidently get into the mixture.

This metal salt of the organic amide is preferably mixed with the inert organic solvent which has been dried. The inert organic solvents are those solvents which are unreactive toward the metal salt of the organic amide, the organohalosilane and the amidosilane products. This mixture of organic solvent and metal salt of the organic amide is a suspension wherein the suspension is maintained by agitation. Essentially anhydrous conditions are maintained by using means to prevent moisture from entering the reaction mixture, such as gas inlets and exits are fitted with devices which contain drying compounds over which the gases must pass. The inert organic solvents can be illustrated by hydrocarbons such as toluene, benzene, xylene, peptane, hexane, mineral spirits and other mixtures of hydrocarbons, and ethers such as tetrahydrofuran, diethylether, and glycol ethers such as propylene glycol monomethyl ether. The inert organic solvents should be a solvent for the amidosilane, so that the amidosilane can be effectively separated from the by-produced metal halide.

After the suspension of the metal salt of the organic amide is prepared, the organohalosilane is added thereto. The order of addition is not critical, however, it is preferred to add the organohalosilane to the suspension which is being agitated. The rate of addition can vary broadly from all at one time to a drop at a time. Because the reaction between the metal salt of the organic amide and the organohalosilane is exothermic, gradual addition is usually preferred, for example, covering a 10 to 15 minute period. The reaction vessel should be cooled by external means, at least to the extent to maintain the temperature at a controllable reflux temperature. The reaction temperature can vary from room temperature to the reflux temperature of the mixture, preferably the temperature is maintained between 50° C. and reflux temperature of the mixture. The agitation of the reaction mixture is maintained during the addition and thereafter until the by-produced metal halide is to be removed. The reaction is essentially quantitative, free of side reactions, and goes to completion very quickly. The reaction is essentially complete by the time the addition of the organohalosilane is complete. However, the reaction mixture is preferably agitated for a period of time after the addition is completed to insure maximum yield of amidosilane. The completeness of the reaction can readily be determined by checking the acidic or basic character of the reaction mixture by placing a drop of the reaction mixture in water and observing the pH by using litmus paper. If the litmus paper shows neutral or basic, the reaction is considered complete. If the litmus paper indicates acid, the reaction is considered incomplete and indicates residual organohalosilane. To drive the reaction to completion with respect to the organohalosilane, a small amount of the metal salt of the organic amide is added and the reaction mixture agitated a little longer.

After the reaction is completed, the by-produced metal halide is removed. Because the metal halide is insoluble in the organic solvent and the amidosilane product is soluble in the organic solvent, removal of the metal halide from the reaction mixture is conveniently achieved by filtering, centrifuging, decanting or other similar means.

The organoamidosilane product in the organic solvent can be used at this point without further purification. This solvent solution of the organoamidosilane can be used to make solvent solutions of siloxane resins and elastomers to be used as coatings, for example, or other places wherein solvent solutions of siloxanes containing hydrolyzable groups are used.

Many uses of the organoamidosilanes involve nonsolvent systems and for these uses the solvent can be removed. The organic solvent is best removed from the organoamidosilane by distillation and evaporation means. A variety of distillation means can be used including pot distillation, vacuum distillation, strip distillation, and flash distillation. Any of the distillation or evaporation means can be used. However the temperature of the organoamidosilane should be kept below its decomposition temperature and preferably below 150° C. The residue in the distillation or evaporation processes for the removal of the solvent is the organoamidosilane product.

The organohalosilanes have a formula $R''_xSiX_{4-x}$ in which $R''$ is a monovalent hydrocarbon radical of 1 to 18 carbon atoms, X is a halogen radical of chlorine, bromine or iodine and $x$ is 1, 2 or 3. Illustrative of monovalent hydrocarbon radicals by $R''$ are alkyl radicals such as methyl, ethyl, isopropyl, hexyl or octadecyl; alkenyl radicals such as vinyl, allyl or hexenyl; cycloaliphatic radicals such as cyclopentyl, cyclohexyl, cyclohexenyl; and aromatic hydrocarbon radicals such as phenyl, tolyl, xylyl, xenyl, naphthyl, benzyl, beta-phenylethyl, beta-phenylpropyl or gamma-tolylpropyl.

The organohalosilanes can include, for example, methyltrichlorosilane, ethyltrichlorosilane, propyltrichlorosilane, butyltrichlorosilane, vinyltrichlorosilane, pentyltrichlorosilane, phenyltrichlorosilane, octadecyltrichlorosilane, dodecyltrichlorosilane, tolyltrichlorosilane, allyltrichlorosilane, benzyltrichlorosilane, cyclohexyltrichlorosilane, cyclohexenyltrichlorosilane, xenyltrichlorosilane, naphthyltrichlorosilane, methyltribromosilane, ethyltribromosilane, propyltribromosilane, phenyltribromosilane and other monoorganotribromosilanes as illustrated above for the monoorganotrichlorosilanes, methyltriiodosilane, ethyltriiodosilane, phenyltriiodosilane and other monoorganotriiodosilanes as illustrated above for the monoorganotrichlorosilanes, dimethyldichlorosilane, diphenyldichlorosilane, methylphenyldichlorosilane, methylvinyldichlorosilane, methylhexenyldichlorosilane, diethyldichlorosilane, ethylphenyldichlorosilane, methylxenyldichlorosilane, methylcyclohexyldichlorosilane, methyltolyldichlorosilane, dimethyldibromosilane, methylvinyldibromosilane, and other diorganodibromosilanes as illustrated above for the diorganodichlorosilanes, dimethyldiiodosilane, methylvinyldiiodosilane and other diorganodiiodosilanes as illustrated above for the diorganodiiodosilanes, trimethylchlorosilane, methyldiphenylchlorosilane, methylphenylvinylchlorosilane, dimethylvinylchlorosilane, diethylpropylchlorosilane, octadecyldimethylchlorosilane, trimethyliodosilane and other triorganoiodosilanes as illustrated above for triorganochlorosilane, trimethylbromosilane and other triorganobromosilanes as illustrated above for triorganochlorosilane.

The metal salt of the organic amide is used in an amount sufficient enough to provide one molecule of the metal salt of the organic amide for each mole of halogen in the organohalosilane. However, to ensure a complete reaction, the metal salt of the organic amide can be used in slight excess over stoichiometric amounts, such as five weight percent excess over the ratio of one molecule of the metal salt of the organic amide per mole of halogen of the organohalosilane. Because the metal salts of the organic amides are not soluble to any great extent in the organic solvents, the excess is not considered a significant impurity factor in the organoamidosilane product, because it is separated therefrom with the metal halide by-product.

The inert-organic solvent is preferably used in an amount to allow removal of the by-produced metal halide, such as sodium chloride. Thus, widely varying amounts can be used. Because the metal halide is essentially insoluble in the organic solvent, the amount of organic solvent used should be sufficient to solubilize the organoamidosilane product, sufficient enough to allow the reaction mixture to be agitated and sufficient enough to allow separation of the metal halide from the solvent solution. Preferably, the inert solvent is present in an amount sufficient to provide from 30 to 80 weight percent of the reaction mixture. Although large amounts of solvent can be used, it is impractical to use such large amounts that most of the reaction mixture is solvent.

Preferably the organoamidosilanes are prepared with sodium salts of organic amides and organochlorosilanes. The by-produced sodium chloride is more readily disposable than the other metal halides. The metal halides, including sodium chloride, can be disposed of more conveniently when compared to other methods wherein the by-products such as the amine salts and amines are produced.

This method should be carried out under anhydrous conditions because the organoamidosilanes are readily hydrolyzable as well as the starting organohalosilanes. Thus, suitable means to ensure anhydrous conditions should be used, such as a dry nitrogen atmosphere over the reaction mixture, using dry solvent and recovering the organoamidosilanes under anhydrous conditions. The organoamidosilanes should also be stored under anhydrous conditions.

The method of the present invention is a fast, efficient method requiring a minimum of complex equipment, essentially void of side-reactions, produces readily disposable by-products, and provides a product of high purity such as 98 percent pure or greater.

The organoamidosilanes produced by the present method have a formula

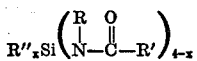

in which $x$, R, R' and R'' are defined above.

These organoamidosilanes are useful as crosslinking agents in silicone rubber, as hydrolyzable silanes to make silicone resins, as chain extenders in silicone rubbers, as endblockers for silicone fluids, silylating agents and the like.

The following examples are only presented for purposes of illustration and should not be construed as limiting the present invention which is properly delineated in the claims.

EXAMPLE 1

To 1500 ml. of dry toluene in a five-liter flask equipped with a stirrer, nitrogen sweep, condenser and addition funnel, 50 g. (2.1 g. atoms) of sodium metal was added. This mixture was heated to reflux to make sodium sand and at the same time the addition of N-methylacetamide (174 g., 2.2 moles) was started. The addition of the N-methylacetamide was completed in 40 minutes with a slight change in color from yellow to light gray yellow observed. No exothermic reaction was observed but gas evolution was observed. After the addition of the N-methylacetamide, the reaction mixture was refluxed for several hours until the sodium metal had disappeared and no gas evolution was evident. The mixture was then cooled. The resulting product was a toluene suspension of the sodium salt of N-methylacetamide,

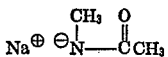

Thereafter, 129 g. of dimethyldichlorosilane was added to the toluene suspension of the sodium salt of N-methylacetamide over a 15 minute period. During this addition, the mixture was externally cooled with an ice-water bath. The mixture was then allowed to stand overnight and the by-produced sodium chloride was removed by passing the mixture through a filter containing a filter aid. The toluene was then removed by vacuum distillation and the silane product distilled wherein the maximum pot temperature was 140° C. The distilled product was 135 g. of dimethyldi(N-methylacetamido)silane,

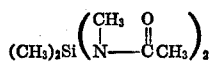

a 68% yield. The dimethyldi(N-methylacetamido) silane had a boiling point range of 87 to 92° C. at 1 mm. of Hg. The dimethyldi-(N-methylacetamido)silane when mixed with a hydroxyl endblocked polydimethylsiloxane fluid having a viscosity of about 4000 cs. at 25° C. chain extended the fluid to a gum. The same results were achieved with the product after the toluene was removed and before distillation.

EXAMPLE 2

A flask equipped with a stirrer, nitrogen sweep, condenser and addition funnel was charged with 300 g. of dry toluene and 250 g. of a toluene slurry of sodium salt of N-methylacetamide having 41 weight percent sodium salt of N-methylacetamide. To this slurry, 70 g. of methylvinyldichlorosilane was added over a 5 to 10 minute period while cooling with an ice-water bath. After the addition was completed, the mixture was heated to reflux and held at reflux for one hour. The resulting mixture was cooled to room temperature and passed through a filter containing filter aid to remove the by-produced sodium chloride from the solvent mixture. The salt filter cake was washed once with toluene and the wash was combined with the filtrate. The toluene was stripped from the filtrate using a Rinco evaporator to produce 99.5 g. of methylvinyldi-(N-methylacetamido)silane, a 93% yield. Analysis by gas liquid chromatography showed the product to be greater than 98% methylvinyldi-(N-methylacetamido)silane. The boiling point range was 85 to 88° C. at 1 mm. of Hg.

EXAMPLE 3

By the procedure of Example 1, 241 g. of N-methylacetamide was added to 69 g. of sodium metal in 2,000 ml. of dry toluene over a 1 hour and 15 minute period and thereafter refluxed for 2.5 hours, to obtain the slurry of sodium salt of N-methylacetamide in toluene. To the above slurry, 149.5 g. of methyltrichlorosilane was added over a 15 minute period while the mixture was externally cooled by an ice-water bath. After the addition of the methyltrichlorosilane was completed, the mixture was refluxed for 30 minutes and then allowed to stand overnight. The resulting mixture was filtered and the toluene removed by vacuum stripping. This product was a light yellow liquid in an amount of 244 g., or a crude yield of 94% methyltri-(N-methylacetamido)silane. This light yellow liquid product crystallizes upon standing at room temperature.

EXAMPLE 4

In a 5 liter flask, 615 g. of sodium salt of N-methylacetamide and 1685 g. of dried toluene was added. To this mixture, 323 g. of vinyltrichlorosilane was added over a 15 minute period using an ice-water bath during the addition for cooling. The temperature approached reflux during the addition. After the addition was complete, the mixture was heated to reflux for 30 minutes and then cooled. The by-produced sodium chloride was removed by filtering through a filter aid cake with some filter aid mixed into the reaction mixture to assist the filtration. The light brown filtrate was stripped to toluene by using a Rinco evaporator, the heat source being hot water at about 50° C. The product was obtained in an amount of 473 g. or a crude yield of 86% of vinyltri-(N-methylacetamido)silane. A mixture of a small amount of this vinyltri-(N-methylacetamido)silane with hydroxyl endblocked polydimethylsiloxane fluid having a viscosity of about 4,000 cs. at 25° C. cured to a rubbery material in about 5 minutes upon mixing. The vinyl tri(N-methylacetamido)silane is initially a liquid which solidifies upon standing at room temperature.

EXAMPLE 5

(A) In a flask under a nitrogen atmosphere, 92 g. of sodium metal was mixed with 2500 ml. of dry toluene and then heated to make sodium sand. To this mixture, 321 g. of N-methylacetamide was added. The reaction was completed in one hour and then the mixture was refluxed for one additional hour. The resulting slurry of sodium salt of N-methylacetamide was externally cooled with an ice bath and a mixture of 211 g. of methylvinyldichlorosilane and 37.2 g. of methyltrichlorosilane was added in a few minutes time. The mixture was then cooled, filtered and the toluene removed by an evaporator to give a 95% yield of a mixture of about 6 moles of methylvinyldi-(N-methylacetamido)silane and 1 mole of methyltri-(N-methylacetamido)silane.

(B) In a flask under a nitrogen atmosphere, 71.3 g. of sodium in 2,000 ml. of dry toluene was heated to make sodium sand. To this mixture, 241 g. of N-methylacetamide was added over a one hour period and thereafter the mixture was refluxed for one hour. The resulting toluene suspension of the sodium salt of N-methylacetamide was externally cooled by an ice bath. The addition of a mixture of 148.5 g. of dimethyldichlorosilane and 34.4 g. of methyltrichlorosilane was added to the toluene suspension of the sodium salt of N-methylacetamide over a 20 minute period during which the reaction mixture was externally cooled by an ice bath. After completing the addition of the silane mixture, the reaction mixture was heated to reflux for 15 minutes. The reaction mixture was cooled and filtered to yield a clear yellow liquid which was stripped of the toluene by a Rinco evaporator using water at 50° C. as the heat source. The resulting product was 261 g. of a yellow mixture of 5 moles of dimethyldi-(N-methylacetamido)silane and one mole of methyltri-(N-methylacetamido)silane, an 85% yield.

EXAMPLE 6

When the metal salts of organic amides listed below are reacted with the organohalosilanes listed below by the method of Example 2, the products shown are obtained.

TABLE

| | Metal salt of organic amide | Organohalosilane | Product |
|---|---|---|---|
| 1 | $CH_3$ $O$<br>$KN$——$\overset{\|\|}{C}CH_3$ | $C_6H_5SiCl_3$ | $CH_3$ $O$<br>$C_6H_5Si(N$——$\overset{\|\|}{C}CH_3)_3$ |
| 2 | $CH_3$ $O$<br>$LiN$——$\overset{\|\|}{C}CH_3$ | $CH_3CH_2SiBr_3$ | $CH_3$ $O$<br>$CH_3CH_2Si(N$——$\overset{\|\|}{C}CH_3)_3$ |
| 3 | $C_2H_5$ $O$<br>$NaN$——$\overset{\|\|}{C}CH_3$ | $CH_3$<br>$C_{18}H_{37}SiI_2$ | $C_2H_5$ $O$<br>$C_{18}H_{37}Si(N$——$\overset{\|\|}{C}CH_3)_2$<br>$CH_3$ |
| 4 | $CH_3$ $O$<br>$NaN$——$\overset{\|\|}{C}CH_3$ | $CH_2=CH(CH_2)_2SiCl$ | $CH_3$ $O$<br>$CH_2=CH(CH_2)_2SiN$——$\overset{\|\|}{C}CH_3$ |
| 5 | $C_6H_5$ $O$<br>$KN$——$\overset{\|\|}{C}CH_3$ | cyclopentyl-$SiBr_3$ | cyclopentyl-$CHSi(N$——$\overset{\|\|}{C}CH_3)_3$ with $C_6H_5$ |
| 6 | $CH_3$ $O$<br>$LiN$——$\overset{\|\|}{C}C_6H_5$ | $CH_3$<br>$CH_3CHSiCl_2$ | $CH_3$ $CH_3$ $O$<br>$CH_3CHSi(N$——$\overset{\|\|}{C}C_6H_5)_2$ |
| 7 | $C_3H_7$<br>$KN$——$\overset{\|\|}{C}CH_2CH_3$ | $(CH_2=CH)(CH_3)SiCl_2$ | $C_3H_7$ $O$<br>$(CH_2=CH)(CH_3)Si(N$——$\overset{\|\|}{C}CH_2CH_3)_2$ |

That which is claimed is:

1. A method for the preparation of amidosilanes comprising mixing a metal salt of an organic amide and an organohalosilane under anhydrous conditions in a sufficient amount of an inert organic solvent to allow separation of product from by-produced metal halide, while maintaining the reaction mixture under agitation at least until the reaction is complete, said metal salt of an organic amide having a formula MN(R)C(O)R' in which M is selected from the group consisting of lithium, sodium and potassium, R is selected from the group consisting of methyl, ethyl, propyl, and phenyl, and R' is selected from the group consisting of methyl, ethyl and phenyl, said organohalosilane having a formula R''$_x$SiX$_{4-x}$ in which each R'' is a monovalent hydrocarbon radical having from 1 to 18 carbon atoms per radical, X is selected from the group consisting of chlorine, bromine and iodine, and x is an integer from 1 to 3 inclusive, and thereafter separating by-produced metal halide from an organic solvent solution of amidosilane of the formula R''$_x$Si{N(R)C(O)R'}$_{4-x}$ wherein R, R', R'' and x are defined above.

2. The method in accordance with claim 1 in which the organic solvent is separated from the amidosilane while maintaining the temperature below the decomposition temperature of the amidosilane.

3. The method in accordance with claim 1 in which the organic solvent is selected from the group consisting of hydrocarbon and ether and is present in an amount of from 30 to 80 weight percent based on the total weight of the reaction mixture.

4. The method in accordance with claim 1 in which the organohalosilane is added to a mixture of the metal salt of the organic amide while maintaining the temperature between room temperature and reflux temperature of the reacting mixture.

5. The method in accordance with claim 2 in which the organic solvent is separated from the amidosilane while maintaining the amidosilane at a temperature less than 150° C.

6. The method in accordance with claim 1 in which the metal salt of the organic amide is the sodium salt of N-methylacetamide.

7. The method in accordance with claim 2 in which the metal salt of the organic amide is the sodium salt of N-methylacetamide.

8. The method in accordance with claim 3 in which the metal salt of the organic amide is the sodium salt of N-methylacetamide and the organic solvent is toluene.

9. The method in accordance with claim 8 in which the organohalosilane is added to a mixture of the sodium salt of N-methylacetamide while maintaining the temperature between 50° C. and reflux temperature of the reacting mixture.

10. The method in accordance with claim 9 in which the toluene is separated from the amidosilane by vacuum evaporation means while maintaining the amidosilane at a tempeature less than 150° C.

11. The method in accordance with claim 9 in which the toluene is separated from the amidosilane by distillation means while maintaining the amidosilane at a temperature less than 150° C.

References Cited
UNITED STATES PATENTS

| | | | |
|---|---|---|---|
| 2,876,209 | 3/1959 | DeBonneville et al. | 260—448.2 N X |
| 2,876,234 | 3/1959 | Hurwitz et al. | 260—448.2 N X |
| 3,440,261 | 4/1969 | Saam | 260—448.2 N |
| 3,488,371 | 1/1970 | Klebe | 260—448.2 N |

DANIEL E. WYMAN, Primary Examiner

P. F. SHAVER, Assistant Examiner

U.S. Cl. X.R.

260—448.2 N